United States Patent
Rose et al.

(10) Patent No.: US 7,424,428 B2
(45) Date of Patent: Sep. 9, 2008

(54) AUTOMATIC DIALOG SYSTEM WITH DATABASE LANGUAGE MODEL

(75) Inventors: Georg Rose, Düsseldorf (DE); Juergen Te Vrugt, Aachen-Eilendorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 847 days.

(21) Appl. No.: 10/220,670

(22) PCT Filed: Jan. 8, 2002

(86) PCT No.: PCT/IB02/00035

§ 371 (c)(1),
(2), (4) Date: Sep. 4, 2002

(87) PCT Pub. No.: WO02/056199

PCT Pub. Date: Jul. 18, 2002

(65) Prior Publication Data

US 2004/0034518 A1  Feb. 19, 2004

(30) Foreign Application Priority Data

Jan. 10, 2001 (DE) ................. 101 00 725

(51) Int. Cl.
*G10L 15/18* (2006.01)
*G06F 17/27* (2006.01)
(52) U.S. Cl. .................. 704/257; 704/9; 704/251
(58) Field of Classification Search .............. None
See application file for complete search history.

(56) References Cited

U.S. PATENT DOCUMENTS 5,488,652 A * 1/1996 Bielby et al. ............ 379/88.03
5,638,425 A * 6/1997 Meador et al. ........... 379/88.01
5,839,106 A * 11/1998 Bellegarda ................ 704/257
5,899,973 A * 5/1999 Bandara et al. ......... 704/256.2
6,314,399 B1 * 11/2001 Deligne et al. ............. 704/257
6,334,102 B1 * 12/2001 Lewis et al. ................ 704/255
6,379,181 B1 * 4/2002 Chang et al. ............... 439/567
6,418,431 B1 * 7/2002 Mahajan et al. .............. 707/4
6,430,551 B1 * 8/2002 Thelen et al. ................. 707/3
6,622,119 B1 * 9/2003 Ramaswamy et al. ........ 704/9
6,662,157 B1 * 12/2003 Horowitz et al. ........... 704/235
6,973,429 B2 * 12/2005 Smith ........................ 704/257
7,043,422 B2 * 5/2006 Gao et al. ...................... 704/9

FOREIGN PATENT DOCUMENTS

WO   WO9613030   2/1996

OTHER PUBLICATIONS

Brown et al., "Stochastic Langauge Models (N-gram) Specification", W3C Working Draft, Jan. 3, 2001, Available at: http://www.w3.org/TR/2001/WD-ngram-spec-20010103.*
Atterwater et al: "Issues in large-vocabulary interactive speech systems," BT Technology Journal, vol. 14, No. 1, Jan. 14, 1996, pp. 177-186.
U.S. Appl. No. 60/240,390, Mingjing Li.

* cited by examiner

*Primary Examiner*—David R. Hudspeth
*Assistant Examiner*—Brian L Albertalli

(57) ABSTRACT

An automatic dialog system for spoken inquiries into a database entry which contains several components available for inquiry, wherein speech recognition of a spoken utterance for inquiring into the database entry is supported by a language model which was prepared before a start of the dialog to which the spoken utterance belongs and which models a relative frequency of correlated occurrence of the components of the database entry provided for the inquiry in the spoken utterance of the dialog.

11 Claims, 2 Drawing Sheets

...
GEYER, PAUL, PLUMBING, GAS AND WATER FITTERS;
MAYR, ELFRIEDE, LOCKSMITHS;
MEYER, PAUL, PLUMBING, ELECTRICAL INSTALLATIONS;
MEYER, ELFI, PLUMBING, GAS AND WATER FITTERS;
...

AUTOMATIC DIALOG SYSTEM WITH DATABASE LANGUAGE MODEL

The invention relates to an automatic dialog system for spoken database inquiries. Such dialog systems are used inter alia for providing information or for carrying out bank transactions by telephone or through public user terminals. Known systems are, for example, the timetable information system of the Swiss Railways and the flight information system of the German air carrier Lufthansa. The IVR (Interactive Voice Response) systems marketed by various companies such as, for example, Periphonics belong to this category. It is common to all these systems that a user enters into a spoken dialog with a machine so as to obtain the information desired or to carry out the desired transactions. More recent systems use not only the spoken interaction but also further media such as, for example, visual screen displays or the transmission of a fax message.

An automatic dialog system for, for example, spoken telephone directory inquiries is known, for example, from WO 96/13030. This describes inter alia a dialog procedure to be followed by a user so as to obtain the telephone number of a person listed in the telephone directory database (residential listing) from the automatic system. For this purpose, the user must indicate in individual dialog items (or "turns") the town, road, and surname.

The dialog system interconnects these indications, for example, in that it makes a list of possible recognition results which meet a prescribed threshold of similarity to the respective spoken item for each spoken item of the user by means of speech recognition, and compares these lists with the directory database. This comparison then leads to a (possibly empty) list of database or directory entries of which the town, road, and surname have a sufficient similarity to the respective spoken utterances of the user.

If the number of directory entries thus determined is small enough, for example smaller than 3, the dialog system will make these directory entries including the respective telephone numbers known to the user. If not, the system can ask further information such as, for example, a spelling of the town name from the user, which spelling will then be interconnected in a similar manner with the information already present and possibly with the directory database. Such a procedure, however, is also possible if one of the above recognition steps either supplies no result at all, or supplies only one result which is very dissimilar to the corresponding spoken item from the user. A further possibility of use of the request for additional information arises when the collected information cannot be matched to the directory database, i.e. if no directory entry fitting the relevant information can be determined. If all possibilities of the automatic system of supplying the user with the desired information fail, for example because the user is unable to give further information in the case described above, the user can be connected to a human operator who will process the request further.

The fact that a user request may be expected to relate to an entry present in the directory can be used for enhancing the recognition accuracy in the speech recognition steps mentioned above. WO 96/13030 proposes two methods for this purpose. On the one hand, the vocabulary for the next recognition step can be put in readiness in accordance with the information already known. For example, if the possible towns have already been recognized, the vocabulary for the road recognition step will be compiled so as to comprise only those roads which belong to entries with the known towns in the directory. On the other hand, the individual words of this vocabulary can be mutually weighted (pre-weighting of the recognition network). For this purpose, those roads which belong to towns having a greater similarity to the spoken item of the town will have a higher weight than those of towns with a smaller similarity.

This weighting of vocabulary words and of sequences of vocabulary words is referred to as a language model in speech recognition, cf. also the publication "D. J. Attwater and S. J. Whittaker: Issues in large-vocabulary interactive speech systems. BT Technology Journal 14 (1996), no. 1, pp. 177-186, January 1996". WO 96/13030 describes how such language models may depend not only on the directory and the recognition results of the user's spoken words already received, but also on further circumstances such as, for example, the number of the caller in the case of telephone information systems, or the time of day.

In WO 96/13030, the vocabularies used after the first recognition step in the further recognition steps, and possibly the language models, are dynamically calculated from the directory (taking into account the recognition results already obtained). In the above example, therefore, the road vocabulary and its language model are dynamically obtained from the directory after the recognition of the town name. Since the dialog system must not keep the user waiting for a reaction for too long, however, such a procedure requires on the one hand a close coupling of the speech recognition system, of which the vocabulary and the language model form part, to the directory. On the other hand, however, specially designed directories are required because the directories in use at any moment are not capable of supplying the required information within the required short time period.

Thus the database must be capable, for example, of supplying within a short time all roads which belong to the one or several towns obtained from the town recognition step during the dynamic composition of the road vocabulary. This function is fully untypical and accordingly requires much time for the databases in use at the time, which are designed for, for example, supplying only the relatively few fitting entries for the given town and the given surname in response to the input of the town and the surname.

It is accordingly an object of the invention to provide an automatic dialog system for the spoken database inquiries of the kind mentioned in the opening paragraph which can operate without this close coupling between the speech recognition system and the database and which can also cooperate with the databases current in use, but which nevertheless utilizes the advantages of an improved recognition performance through the use of language models.

This object is achieved by means of an automatic dialog system for spoken inquiries into a database entry which contains several components available for inquiry, wherein the speech recognition of a spoken utterance for inquiring into the database entry is supported by a language model which is prepared before the start of the dialog to which the spoken utterance belongs and which models the correlated occurrence of the components of the database entry provided for the inquiry in the spoken utterance of the dialog. Since the language model is made ready before the start of the dialog, the requirement that the corresponding information must be quickly obtained from the database becomes redundant. The close coupling between the speech recognition system and the database can accordingly be omitted, and also the databases in use at a given moment can be utilized.

The dependent claims 2 to 4 relate to special embodiments of the language model used within the framework of the automatic dialog system for spoken database inquiries. Which of these embodiments can be used particularly advantageously in practice depends on the knowledge of the user behavior and on the available hardware and software resources of the dialog system.

In claim 5, however, the invention relates to a speech recognition system for recognizing a spoken utterance for the spoken inquiry after a database entry which comprises several components available for inquiry, wherein the speech recognition system is supported by a language model which was prepared before the start of the dialog to which the spoken utterance belongs and which models the correlated occurrence of the components of the database entry provided for the inquiry in the spoken utterance of the dialog. Such a speech recognition system may be used, for example, as a system component of a dialog system according to the invention for spoken database inquiries.

In claim 6, the invention relates to a language model for supporting the speech recognition of a spoken utterance for spoken inquiries after a database entry which comprises several components available for inquiry, wherein the language model is prepared before the start of the dialog to which the spoken utterance belongs, and wherein the language model models the correlated occurrence of the components of the database entry provided for the inquiry in the spoken utterance of the dialog. Such a language model can be used, for example, within the framework of a dialog system according to the invention for oral database inquiries.

In claim 7, however, the invention also relates to a method of orally inquiring into a database entry which comprises several components available for inquiry, wherein the speech recognition of a spoken utterance for inquiring into the database entry is supported by a language model which was constructed before the start of the dialog to which the spoken utterance belongs and which models the correlated occurrence of the component of the database entry provided for the inquiry in the spoken utterance of the dialog.

These and further aspects and advantages of the invention will be explained in more detail below with reference to the embodiments and in particular the appended drawings, in which.

Figures 1, 2:
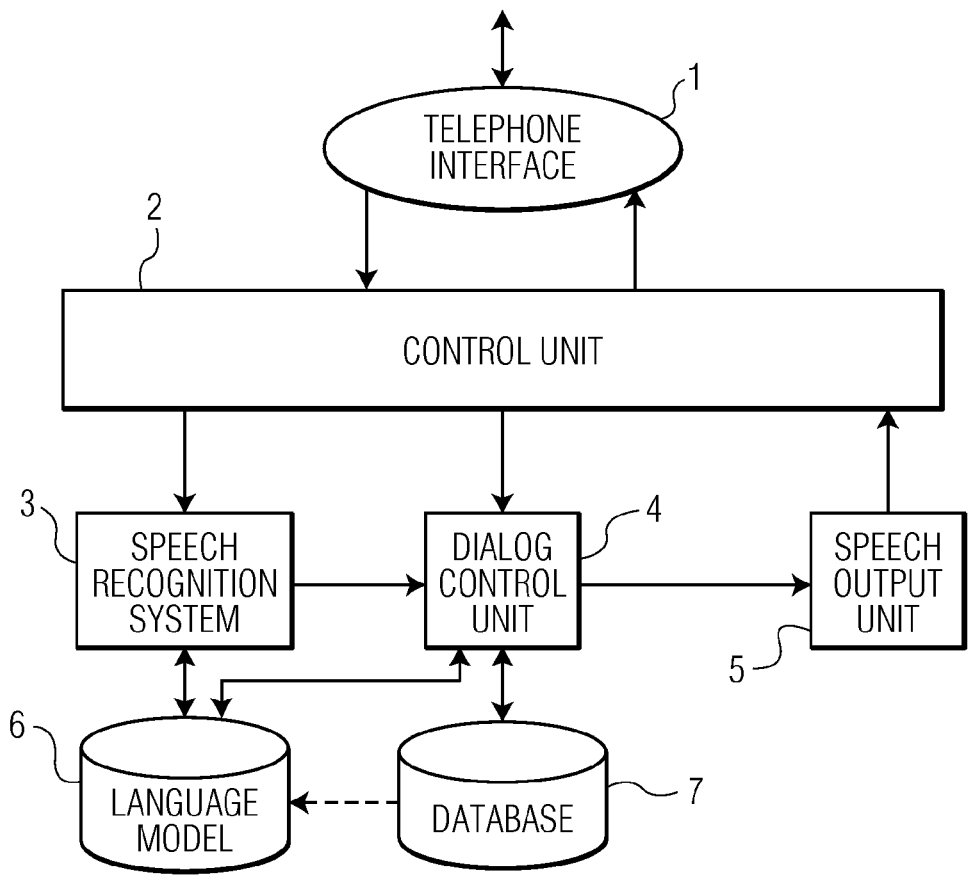
FIG. 1 shows an embodiment of a dialog system according to the invention for spoken database inquiries.
FIG. 2 shows an excerpt from the yellow pages of a telephone directory of a town.

FIG. 1 shows an embodiment of a dialog system according to the invention for spoken database inquiries. A telephone call from a system user enters a telephone interface 1 coupled to the public telephone network, which interface is bidirectionally connected to the control unit 2 for interfacing with the network interfaces and for input and output, where the call is received and centrally processed. The control unit 2 for network interfaces and for input and output transmits a spoken utterance from the user to the speech recognition system 3, which recognizes the utterance using the language model 6, i.e. extracts those components from the spoken utterance which are relevant to the database inquiry.

This recognition in the speech recognition system 3 usually first comprises a conversion of the spoken utterance into text, the so-called text-to-speech conversion or speech recognition in a narrower sense. During this, either only a single text hypothesis may be generated for the spoken utterance, or a plurality of different text hypotheses, which will subsequently be organized, for example, in the form of so-called N-best lists or in the form of word graphs. In addition, such text hypotheses may be provided with scores which correspond, for example, to the degree of similarity of the text hypothesis to the spoken utterance.

If the user is allowed to use as a vocabulary only words which are contained as components of respective entries available for inquiry in the database, the text-to-speech step is already sufficient, with the exception of the treatment of spellings. If the user is allowed to use other words as well, for example words for greeting, the text hypotheses must be reduced to those components which are relevant to the database inquiry in the speech recognition system 3. Several methods are known for this purpose in the field of speech recognition: for example, it is possible to cover the irrelevant words with general padding word models (garbage modeling, word spotting), or speech understanding methods such as, for example, grammars, may be applied to the text hypotheses.

If a user is allowed also to use spellings or partial spellings of words, which are contained as the components of corresponding entries available for the inquiry in the database, these spellings have to be converted into the components of the database entry corresponding thereto. If a user says, for example, "Meyer with E. Y.", the information "with E. Y." indicates that a wanted database entry contains the letter sequence "E. Y.". Grammars or automatic status indicators may again be used, for example, for processing such constructions within a language model.

The result of the speech recognition system 3 in these cases is a single recognition hypothesis or a plurality of alternative recognition hypotheses for the spoken utterance, said hypotheses being reduced to those components thereof which are relevant for the database inquiry. Furthermore, these hypotheses may also be provided with scores, depending on the nature of the system, which give an indication, for example, as to the probability that the respective hypotheses represent correct recognitions.

The speech recognition system 3 transmits the recognition hypothesis or hypotheses to the dialog control unit 4, which collects the information supplied by the user during the dialog, which carries out a scanning of the database 7 if sufficient information is available, and which plans the next dialog action of the system. For this purpose, it provides the speech output unit 5 with the contents of the next system utterance to the user. It may, for example, transmit the text of the next system utterance, or alternatively merely a semantic description thereof in this case. Similarly, the speech output unit 5 performs the task of converting the text into speech or additionally obtaining the text from the semantic description first.

The speech output unit 5 transmits the next system utterance in the form of speech to the control unit 2 for network interfaces and input and output, from where it is finally passed on to the user via the telephone interface 1.

FIG. 1 further shows the following as a refinement of the procedure described above in the dialog system for spoken database inquiries: i.e. the control unit 2 for the network interface and input and output can supply further information to the dialog control unit 4. This information may be, for example, the telephone number of the caller or merely an indicator of the region from which the call is made. The dialog control unit 4 may, for example, select different language models 6 in accordance with this information. For example, it is observed in practice that callers from a major city inquiring into a train connection will usually want to travel from this city or to this city. This can be used to advantage for lowering the recognition error rate in the preparation and/or the use of the language models. If this function is to be used, the language model component 6 must be constructed in accordance with the incorporation of the required language models.

The language models 6, however, may be made dependent also on other data, for example on the time of day or the day in the week. In the above example of railway inquiries, substantially different traffic flows are observed on workdays and, for example, on Sundays. The presence of such circumstances may be observed by the dialog control unit 4 and can be passed on to the language models 6, or the language models 6 may monitor this themselves.

It will be obvious to those skilled in the art that the possibilities of system composition shown in FIG. 1 and described above represent only one of many possible modifications. Thus the component for speech understanding may be accommodated as a separate block in several systems, which block may also utilize its own language model which is different from the one used by the speech-to-text conversion component. Special reference is made here to the further possibilities for system construction as described in WO 96/13030, which may also be applied to the present invention.

It is furthermore apparent to those skilled in the art that many detailed aspects of the system are not shown in FIG. 1 and are not discussed for reasons of clarity. Thus the system must obviously take into account the fact that a large number of calls should not lead to a system breakdown, or that spoken utterance with a high noise level should not lead to an overload on the speech recognition system 3. Corresponding communication protocols and error treatments are provided. Thus, for example, a communication direction from the speech recognition system 3 to the control unit 2 for the network interfaces and input and output will usually be provided, through which the speech recognition system 3 can notify that it is prepared to process the next spoken utterance. Furthermore, as was noted above in the discussion of the prior art as represented by WO 96/13030, alternative mechanisms are to be provided for the case in which, for example, the speech recognition system 3 generates no recognition result at all for a spoken utterance, for example on account of difficult acoustic conditions.

During operation of the dialog system, furthermore, statistical data, for example relating to the calling behavior of the user, may be collected and used for adapting the language models 6. Finally, the broken-line connection shown in FIG. 1 between the database 7 and the language models 6 indicates that the language models 6 are generated with the use of the information contained in the database 7.

The operation of the dialog system for spoken database inquiries will now be explained in more detail with reference to FIGS. 2 and 3, relating to the example of an inquiry into the telephone number of a company (business white pages or yellow pages). For this purpose, FIG. 2 shows an excerpt from the yellow pages of a telephone directory of a town. Four database entries are shown which have the following characteristics in this particular case: the surnames of the company owners are acoustically similar and can accordingly be easily mixed up; and furthermore, three of the companies have the indicator "Plumbing" in their database entries.

Figure 3:
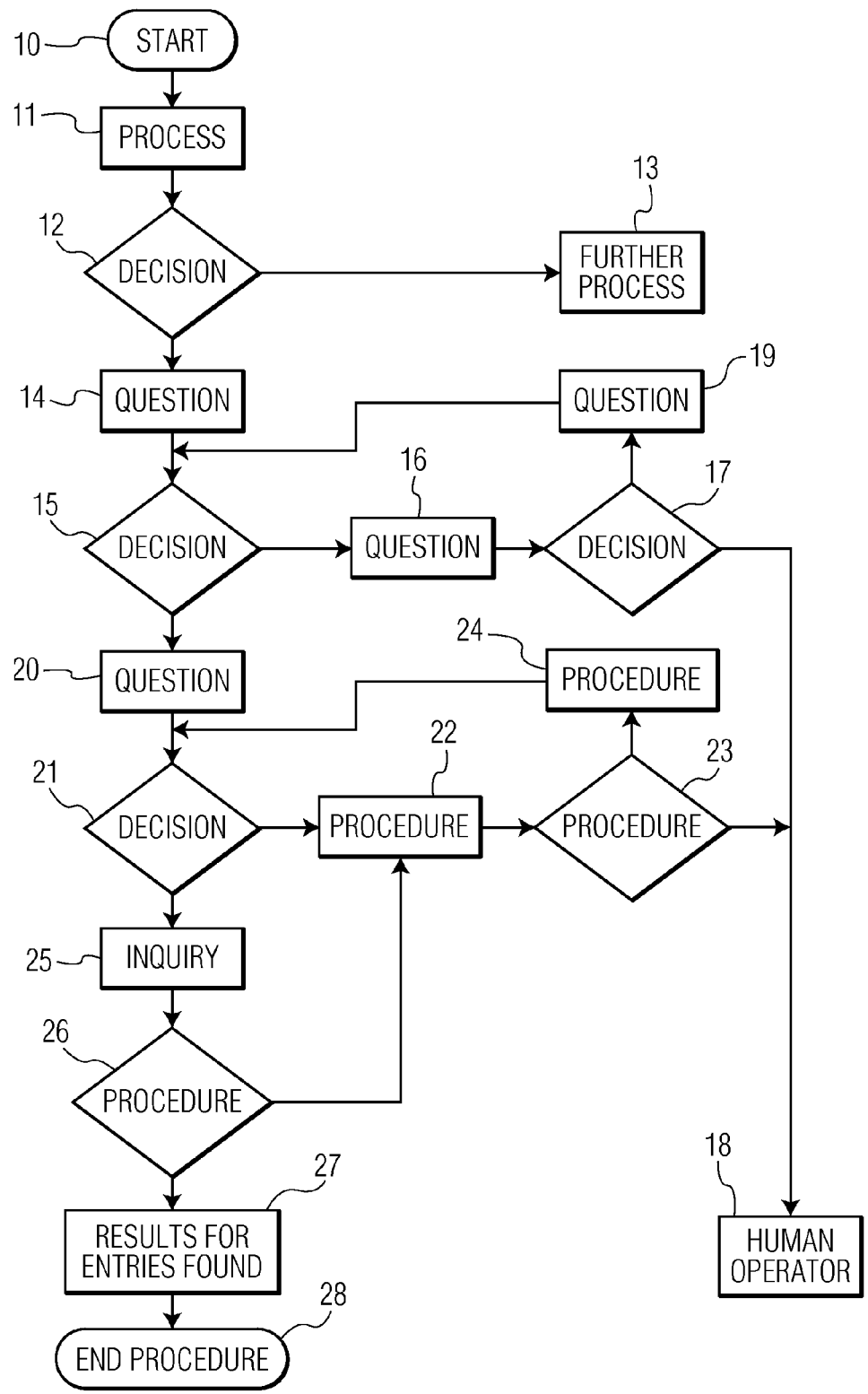
FIG. 3 shows a possible procedure of a spoken database inquiry in the form of a flowchart.

FIG. 3 shows the process of dealing with a spoken database inquiry in the form of a flowchart. The process starts in a start block 10, whereupon the user is asked in a process block 11 whether he wants to have the telephone number of a private individual (white pages query) or of a company (yellow pages query). Depending on the recognized user reply, the control branches off after a decision block 12. If the user wants the telephone number of a private individual, the further processing will take place in a block 13 which has no further sequence in FIG. 3. If, however, he wants the telephone number of a company, he will be asked next in a block 14 for the town in which the company or branch of the company whose number he is requesting has its seat.

The user reply is recognized, and a list of the recognized town names with sufficiently high scores is made. It is assumed here for the sequence that the list is not empty. The case in which the recognition was unsuccessful is accordingly not indicated here. If the number of recognized town names is not small enough in the list, for example not smaller than 3, which is decided in block 15, the system will try to limit the town selection further. This process serves to prevent that a choice is to be made from among an excessively large number of database entries in the subsequent steps.

To limit the town selection further, it is first ascertained in block 16 by updating of a counter how often an attempt has been made already to ask a further question about the respective town. It may also be ascertained here which questions have already been asked with respect to the town. It is then decided in block 17 through evaluation of the information from block 16 whether a further search for the town is yet to be carried out. If this is not the case, the further discussion with the user is handed over to a human operator in block 18, not shown in any more detail, in this embodiment of the invention. In the opposite case, a further question as to the town is put to the user in block 19, for example he is requested to spell the town name, or alternatively, for example, the names of large towns in the vicinity are requested, or a repetition of the town name is simply requested. If such additional descriptive data such as, for example, the indication of alternative larger towns in the vicinity is to be processed, methods of artificial intelligence are to be used, which may be located, for example, within the architecture of the dialog control 4 of FIG. 1.

It is subsequently decided once more in block 15 whether the town list is now small enough. The limitation procedure for the town name is repeated so many times by traversing blocks 16, 17, and 19 that subsequently either the dialog can be passed on to the human operator in block 18, or the town list is evaluated as being small enough by block 15. When this is the case, i.e. the town list is small enough, the user is asked in block 20 for the name of the company whose number he wants. It is subsequently decided in block 21 whether the dialog system has enough information for a promising database inquiry. The system may require, for example, that the user supplies it at least with part of the company's activity, for example "Plumbing", and that the user mentions a component of the company name, for example the German name of "Meyer". If several recognition alternatives with sufficiently high scores are used, this means that the list of possible alternatives is small enough, as for example in the case of the town recognition described above.

If the information appears to be not promising for a successful database inquiry to the system, the process runs as in the limitation of the town selection: a counter is updated in block 22 as to how often a more precise information on the company was attempted. It is further ascertained which questions have already been put in relation to the company. It is subsequently decided in block 23 through evaluation of the information from the further conversation with the user is again passed on to a human operator in block 18 in this embodiment of the invention. In the opposite case, a further question about the company is put to the user in block 24, for example a spelling of the company name is requested, further components of the company name and/or the company activity are requested, or simply a repetition of the company name is requested.

It is then decided once more in block 21 whether the database inquiry now seems to promise a result. The further narrowing-down of the company information through the procedure of blocks 22, 23, and 24 is repeated so many times until either the conversation is passed on to the human operator in block 18 or the database inquiry is evaluated as promising by the block 21. When this is the case, i.e. the database inquiry promises to give a result, this inquiry is carried out in block 25. It is then decided in block 26 whether the number of database entries with sufficiently high scores supplied in response is small enough, i.e. for example smaller than 3. If this is not the case, the system returns to block 22 again for a further narrowing-down of the company information by the procedure described above, or for passing it on to a human operator in block 18.

However, if the number of returned database entries with a sufficiently high score is small enough, possibly after a repeated input into block 26, the database entries found are communicated to the user in block 27, complete with their telephone numbers. The procedure is ended in end block 28. For this purpose, the system may give a closing utterance to the user and end the telephone conversation. Alternatively, however, the user may be given the possibility of entering a further inquiry, and if he wishes to avail himself of this, he may provide a fresh input, for example in block 11.

The replies from a user and the speech recognition thereof are not depicted explicitly in FIG. 3. It is obvious, however, that a user reply is expected after each system prompt in the blocks 11, 14, 19, 20, and 24. The speech recognition of these user replies are supported by a language model according to the invention which was constructed before the start of the dialog to which the spoken utterance belongs and which models the correlated occurrence of the components of the database entry provided for the inquiry in the spoken utterance of the dialog.

Such a language model is made up with the use of the database, and possibly of further telephone call statistics, before the start of the dialog with the user. No database inquiries for adapting the language model take place during the dialog, so that it is no longer necessary to have a database which is closely coupled to the speech recognition system and which can react quickly.

There is a possibility of adapting the language model to the calling statistics observed until that moment and/or to changed databases before the start of a dialog or, for example, to construct it completely anew. Since such adaptations or new constructions can be very complicated and time-consuming, depending on the extent thereof, they will usually be moved to time periods in which the system has to cope with few inquiries, i.e., for example the hours between midnight and early morning.

A language model according to the invention for supporting the speech recognition system models the correlated occurrence of the components of a database entry provided for the inquiry in spoken utterance. Such correlations, for example, consist in the fact that most companies, and in particular large companies, have their seats in major cities, i.e. that an inquiry into a company leads to a higher probability of the user wanting a telephone number in a major city. Calling statistics further show that most users ask for telephone numbers which are actually present in the database, i.e. the probability of a simultaneous occurrence of components which would lead to a non-existent database entry is only small.

It is not important for the modeling in spoken utterance of components of a database entry provided for the inquiry occurring in correlation whether these components occur together in one spoken utterance or whether they are distributed over several utterance. Thus, for example, the town in which a telephone number is requested is separately sought in block 14 of FIG. 3, whereas the question as to the company was asked without further limitations in block 20. It is accordingly to be expected that many users will also mention the town separately, for example in the case of "Berlin" (in Germany), while probably they will mention several components of the company entry simultaneously, for example "I would like the Mayr Company, Locksmiths". The language model, however, may provide scores for the relevant total information also in this case, i.e. in the town recognition for the total of the information "company, town: Berlin", and in the company recognition "company, town: Berlin, Mayr, Locksmiths".

Furthermore, the language model may also take into account that the information is given in different spoken uttrance, i.e. it can model the boundaries of the spoken uttrance. On the other hand, for example for reasons of simplicity, it may only evaluate the information from within one spoken uttrance.

The database entries shown in FIG. 2 will now be used as an example for further clarification of what was said above and for demonstrating possible embodiments of language models. For simplicity's sake, only the relative scores of the four entries shown in FIG. 2 with respect to one another are considered, i.e., for example, the question relating to the town selection is not considered in this clarification.

First of all, there is the possibility of giving all entries present in the database the score 1, while all other combinations of components, which have no corresponding entry in a database, are given the score 0. This may be interpreted such that the language model distinguishes only between the entries present in the database as being "admitted" and all other combinations of components as being "not admitted". The scores shown in the following Table are thus obtained in the example of FIG. 2.

| Combination of components | Score |
|---|---|
| Plumbing | 1 |
| Plumbing, Paul | 1 |
| Meyer, Elfi, Plumbing, Gas and Water Fitters | 1 |
| Geyer, Otto | 0 |
| Karl | 0 |
| Mayr, Elfriede, Plumbing | 0 |

The second possibility is that the score 0 for combinations of components not present in the database is maintained, while entries present in the database are judged in accordance with their relative frequencies. The scores shown in the next Table are then obtained for the examples given above.

| Combination of components | Score |
|---|---|
| Plumbing | 3/4 |
| Plumbing, Paul | 1/2 |
| Geyer, Paul, Plumbing, Gas and Water Fitters | 1/4 |
| Geyer, Otto | 0 |
| Karl | 0 |
| Mayr, Elfriede, Plumbing | 0 |

The score for "Plumbing" then becomes 3/4, because the word "plumbing" occurs in 3 out of the 4 database entries. The combination of components "Plumbing, Paul" occurs in 2 out of the 4 entries, so their score is 2/4=1/2. Similarly, the combination of components "Geyer, Paul, Plumbing, Gas and Water Fitters" is given the score 1/4. It was assumed here that the sequence of the components in the combination of components is irrelevant, i.e. the language model evaluates only the presence of a component in the combination of components. This, however, is not necessary for the invention. Thus, for example, in an alternative embodiment, the scores for "Plumbing, Paul" and "Paul, Plumbing" may be different so as to model, for example, an observed user preference.

A third possibility for the language model scores is to assign a score to combinations of components not present in the database in accordance with the relative frequency of such combinations observed with the users. The relative frequencies of entries present in the database can be further utilized as above. The scores shown in the following Table, for example, may be obtained thereby.

| Combination of components | Score |
|---|---|
| Plumbing | 0.75 |
| Plumbing, Paul | 0.47 |
| Geyer, Paul, Plumbing, Gas and Water Fitters | 0.02 |
| Geyer, Otto | 0.05 |
| Karl | 0 |
| Mayr, Elfriede, Plumbing | 0.1 |

It was assumed here that the users never use Christian names (Karl) and professional activities (Plumbing) which are not present in the database, but that there is a certain probability that combinations of Christian names and surnames (Geyer, Otto), combinations of Christian names and company activities (Plumbing, Paul) and complete company identifications (Geyer, Paul, Plumbing, Gas and Water Fitters; Mayr, Elfriede, Plumbing) will occur, though they do not belong to the database entries.

The technical processes for estimating the language models described from the database and, for example, from user statistics are sufficiently known to those skilled in the art. It suffices here to mention by way of example the so-called N-gram language models and stochastic grammars. The possibility that a user will also use combinations of components which do not belong to a database entry can be taken into account, for example, by a so-called discounting process.

The invention claimed is:

1. An automatic dialog system for spoken inquiries into a database entry which contains components available for inquiry, wherein speech recognition of a spoken utterance for inquiring into the database entry is supported by a language model which is prepared before a start of a dialog to which the spoken utterance belongs and which models a relative frequency of occurrence of the components of the database entry provided for the inquiry in the spoken utterance of the dialog, wherein the relative frequency is independent of an ordering of words in the spoken utterance.

2. The automatic dialog system for spoken database inquiries of claim 1,
wherein the language model assigns a score 0 to the occurrence of components of a data record in the spoken utterance which is not contained in the inquired database.

3. The automatic dialog system for spoken database inquiries of claim 1,
wherein the language model assigns to the occurrence of components of a data record in the spoken utterance which is contained in the inquired database a score in accordance with their relative frequency in the inquired database, and
wherein the language model assigns the score 0 to the occurrence of components of a data record in the spoken utterance which is not contained in the inquired database.

4. The automatic dialog system for spoken database inquiries of claim 1,
wherein the language model assigns to the occurrence of components of a data record in the spoken utterance which is contained in the inquired database a score in accordance with their relative frequency in the inquired database, and
wherein the language model assigns to the occurrence of components of a data record in the spoken utterance which is not contained in the inquired database a score in accordance with the relative frequency of such spoken utterance.

5. The automatic dialog system for spoken database inquiries of claim 1, wherein said components are distributed over several utterances.

6. A speech recognition system for recognizing a spoken utterance for the spoken inquiry after a database entry which comprises components available for inquiry, wherein the speech recognition system is supported by a language model which is prepared before a start of a dialog to which the spoken utterance belongs and which models a relative frequency of occurrence of the components of the database entry provided for the inquiry in the spoken utterance of the dialog, wherein the relative frequency is independent of an ordering of words in the spoken utterance.

7. The speech recognition system of claim 6, wherein said components are distributed over several utterances.

8. A computer readable medium encoded with a data structure comprising a language model for supporting speech recognition of a spoken utterance for spoken inquiries of a database entry which comprises components available for inquiry,
wherein the language model is prepared before a start of the dialog to which the spoken utterance belongs, and wherein the language model models a relative frequency of occurrence of the components of the database entry provided for the inquiry in the spoken utterance of a dialog, wherein the relative frequency is independent of an ordering of words in the spoken utterance.

9. The computer readable medium of claim 8, wherein said components are distributed over several utterances.

10. A method of orally inquiring into a database entry which comprises components available for inquiry, wherein the speech recognition of a spoken utterance for inquiring into the database entry is supported by a language model which was constructed before the start of a dialog to which the spoken utterance belongs and which models the relative frequency of occurrence of the component of the database entry provided for the inquiry in the spoken utterance of the dialog, wherein the relative frequency is independent of an ordering of words in the spoken utterance.

11. The method of claim 10, wherein said components are distributed over several utterances.

* * * * *